(12) United States Patent
Zhang et al.

(10) Patent No.: US 11,996,084 B2
(45) Date of Patent: May 28, 2024

(54) SPEECH SYNTHESIS METHOD AND APPARATUS, DEVICE AND COMPUTER STORAGE MEDIUM

(71) Applicant: BEIJING BAIDU NETCOM SCIENCE TECHNOLOGY CO., LTD., Beijing (CN)

(72) Inventors: Liqiang Zhang, Beijing (CN); Jiankang Hou, Beijing (CN); Tao Sun, Beijing (CN); Lei Jia, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 148 days.

(21) Appl. No.: 17/738,186

(22) Filed: May 6, 2022

(65) Prior Publication Data

US 2023/0059882 A1 Feb. 23, 2023

(30) Foreign Application Priority Data

Aug. 17, 2021 (CN) .......................... 202110942295.4

(51) Int. Cl.
| | |
|---|---|
| G10L 13/02 | (2013.01) |
| G06F 40/20 | (2020.01) |
| G10L 13/04 | (2013.01) |
| G10L 13/047 | (2013.01) |
| G10L 13/10 | (2013.01) |

(52) U.S. Cl.
CPC .............. *G10L 13/10* (2013.01); *G06F 40/20* (2020.01); *G10L 13/047* (2013.01)

(58) Field of Classification Search
CPC .......... G10L 13/00; G10L 13/02; G10L 13/04
See application file for complete search history.

(56) References Cited

U.S. PATENT DOCUMENTS

| | | | |
|---|---|---|---|
| 2015/0243275 A1 | 8/2015 | Luan et al. | |
| 2019/0122651 A1 | 4/2019 | Arik et al. | |
| 2020/0082807 A1 | 3/2020 | Kim et al. | |
| 2020/0265829 A1 | 8/2020 | Liu et al. | |

(Continued)

FOREIGN PATENT DOCUMENTS

| | | |
|---|---|---|
| CN | 102201234 A | 9/2011 |
| CN | 102915737 A | 2/2013 |

(Continued)

OTHER PUBLICATIONS

Lu et al., Implementing Prosodic Phrasing in Chinese End-to-End Speech Synthesis, 2019 IEEE International Conference on Acoustics, Speech and Signal Processing (ICASSP), p. 7050-7054.

(Continued)

*Primary Examiner* — Shreyans A Patel
(74) *Attorney, Agent, or Firm* — Brooks Kushman P.C.

(57) ABSTRACT

The present disclosure discloses a speech synthesis method and apparatus, a device and a computer storage medium, and relates to speech and deep learning technologies in the field of artificial intelligence technologies. A specific implementation solution involves: acquiring to-be-synthesized text; acquiring a prosody feature extracted from the text; inputting the text and the prosody feature into a speech synthesis model to obtain a vocoder feature; and inputting the vocoder feature into a vocoder to obtain synthesized speech.

16 Claims, 15 Drawing Sheets

(56) References Cited

U.S. PATENT DOCUMENTS

| | | |
|---|---|---|
| 2020/0394998 A1 | 12/2020 | Kim et al. |
| 2021/0193160 A1 | 6/2021 | Wang et al. |
| 2023/0059882 A1* | 2/2023 | Zhang .................. G10L 13/047 |

FOREIGN PATENT DOCUMENTS

| | | | | |
|---|---|---|---|---|
| CN | 104517614 | A | | 4/2015 |
| CN | 107481713 | A * | 12/2017 | ............ G10L 13/02 |
| CN | 108346424 | A | | 7/2018 |
| CN | 109671422 | A | | 4/2019 |
| CN | 110534089 | A | | 12/2019 |
| CN | 110970014 | A | | 4/2020 |
| CN | 111508469 | A | | 8/2020 |
| CN | 111566656 | A | | 8/2020 |
| CN | 111681641 | A | | 9/2020 |
| CN | 111754976 | A * | 10/2020 | ............ G10L 13/02 |
| CN | 111798832 | A | | 10/2020 |
| CN | 111883149 | A | | 11/2020 |
| CN | 112017644 | A | | 12/2020 |
| CN | 112151003 | A * | 12/2020 | ............ G10L 13/02 |
| CN | 112365875 | A | | 2/2021 |
| CN | 112365880 | A | | 2/2021 |
| CN | 112382267 | A | | 2/2021 |
| CN | 112541078 | A * | 3/2021 | ............ G06F 16/353 |
| CN | 112712812 | A | | 4/2021 |
| CN | 112786006 | A * | 5/2021 | ............ G10L 13/04 |
| CN | 112863482 | A | | 5/2021 |
| CN | 113327579 | A * | 8/2021 | ............ G10L 13/02 |
| EP | 2264696 | A1 | | 12/2010 |
| GB | 2591245 | A | | 7/2021 |
| JP | 11282494 | A | | 10/1999 |
| JP | 2003084787 | A | | 3/2003 |
| JP | 2017015821 | A | | 1/2017 |
| JP | 2018141915 | A | | 9/2018 |
| KR | 20160128871 | A | | 11/2016 |
| WO | 2021006117 | A1 | | 1/2021 |
| WO | 2021083071 | A1 | | 5/2021 |
| WO | 2021085943 | | | 6/2021 |
| WO | 2021118604 | A1 | | 6/2021 |

OTHER PUBLICATIONS

Shen et al.., Natural TTS Synthesis by Conditioning Wavenet on MEL Spectrogram Predictions, 2018, 5 pages, arXiv: 1712.05884v2 [cs.CL] Feb. 16, 2018.

Decision to Grant a Patent of Japanese patent application No. 2022-075811 dated Jun. 20, 2023, 2 pages.

Decision to Grant a Patent of Japanese patent application No. 2022-077078 dated Jun. 13, 2023, 2 pages.

Request for the Submission of an Opinion of Korean patent application No. 10-2022-0057485 dated May 15, 2023, 7 pages.

Request for the Submission of an Opinion of Korean patent application No. 10-2022-0053449 dated May 15, 2023, 7 pages.

* cited by examiner

SPEECH SYNTHESIS METHOD AND APPARATUS, DEVICE AND COMPUTER STORAGE MEDIUM

CROSS-REFERENCE TO RELATED APPLICATIONS

The present application claims the priority of Chinese Patent Application No. 202110942295.4, filed on Aug. 17, 2021, with the title of "SPEECH SYNTHESIS METHOD AND APPARATUS, DEVICE AND COMPUTER STORAGE MEDIUM." The disclosure of the above application is incorporated herein by reference in its entirety.

TECHNICAL FIELD

The present disclosure relates to the field of computer application technologies, and in particular, to speech and deep learning technologies in the field of artificial intelligence technologies.

BACKGROUND

Speech synthesis is a technology of synthesizing inputted text into natural intelligible speech. Fluency, expressiveness and sound quality of speech synthesis directly affect user experience. Therefore, a high real-time rate becomes an urgent problem in the speech synthesis technology.

SUMMARY

In view of the above, the present disclosure provides a speech synthesis method and apparatus, a device and a computer storage medium, so as to improve the real-time rate of the speech synthesis technology.

According to a first aspect of the present disclosure, a speech synthesis method is provided, including acquiring to-be-synthesized text; acquiring a prosody feature extracted from the text; inputting the text and the prosody feature into a speech synthesis model to obtain a vocoder feature; and inputting the vocoder feature into a vocoder to obtain synthesized speech.

According to a second aspect of the present disclosure, an electronic device is provided, including at least one processor; and a memory communicatively connected with the at least one processor; wherein the memory stores instructions executable by the at least one processor, and the instructions are executed by the at least one processor to enable the at least one processor to perform a speech synthesis method, wherein the speech synthesis method includes acquiring to-be-synthesized text; acquiring a prosody feature extracted from the text; inputting the text and the prosody feature into a speech synthesis model to obtain a vocoder feature; and inputting the vocoder feature into a vocoder to obtain synthesized speech.

According to a third aspect of the present disclosure, there is provided a non-transitory computer readable storage medium with computer instructions stored thereon, wherein the computer instructions are used for causing a speech synthesis method, wherein the speech synthesis method includes: acquiring to-be-synthesized text; acquiring a prosody feature extracted from the text; inputting the text and the prosody feature into a speech synthesis model to obtain a vocoder feature; and inputting the vocoder feature into a vocoder to obtain synthesized speech.

It should be understood that the content described in this part is neither intended to identify key or significant features of the embodiments of the present disclosure, nor intended to limit the scope of the present disclosure. Other features of the present disclosure will be made easier to understand through the following description.

BRIEF DESCRIPTION OF THE DRAWINGS

The accompanying drawings are intended to provide a better understanding of the solutions and do not constitute a limitation on the present disclosure. In the drawings.

DETAILED DESCRIPTION

Exemplary embodiments of the present disclosure are illustrated below with reference to the accompanying drawings, which include various details of the present disclosure to facilitate understanding and should be considered only as exemplary. Therefore, those of ordinary skill in the art should be aware that various changes and modifications can be made to the embodiments described herein without departing from the scope and spirit of the present disclosure. Similarly, for clarity and simplicity, descriptions of well-known functions and structures are omitted in the following description.

Figure 1:
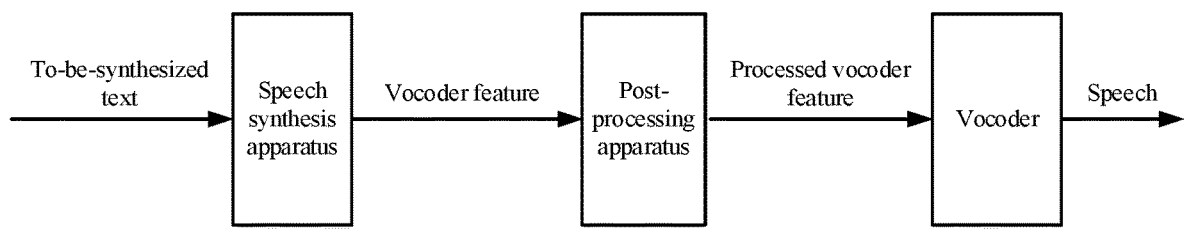
FIG. 1 is a schematic diagram of a basic architecture according to the present disclosure.

To facilitate the understanding of the technical solutions according to the present disclosure, a basic architecture involved in the present disclosure is first briefly introduced. As shown in FIG. 1, the basic architecture involved in the present disclosure includes a speech synthesis apparatus and a vocoder, and a post-processing apparatus may be further included between the speech synthesis apparatus and the vocoder.

The speech synthesis apparatus is configured to process to-be-synthesized text and convert it to a vocoder feature for output. The post-processing apparatus mainly performs the speech synthesis method in the embodiment of the present disclosure, and is configured to optimize the vocoder feature outputted by the speech synthesis apparatus and then output it to the vocoder. The vocoder obtains finally synthesized speech by using the vocoder feature.

Figure 2:
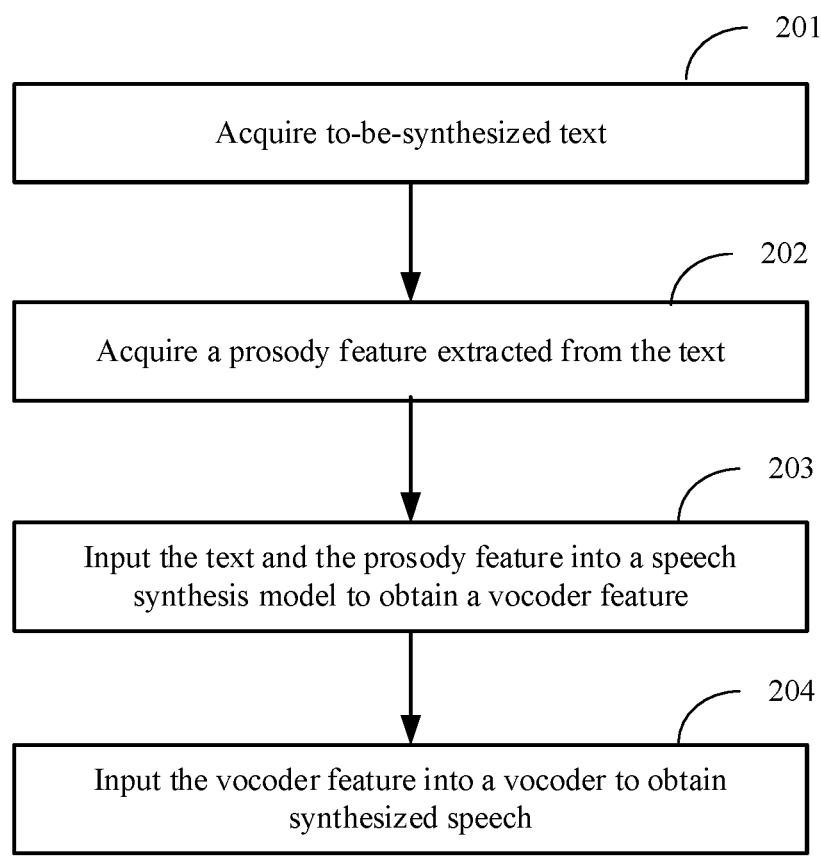
FIG. 2 is a flowchart of a speech synthesis method according to an embodiment of the present disclosure.

FIG. 2 is a flowchart of a speech synthesis method according to an embodiment of the present disclosure. The method is performed by the speech synthesis apparatus shown in FIG. 1. The apparatus may be an application located in a user terminal, or a functional unit in an application located in a terminal such as a plug-in or a Software Development Kit (SDK), or located on a server side, which is not limited in the present disclosure. As shown in FIG. 2, the method may include the following steps.

In 201, to-be-synthesized text is acquired.

In 202, a prosody feature extracted from the text is acquired.

In 203, the text and the prosody feature are inputted into a speech synthesis model to obtain a vocoder feature.

In 204, the vocoder feature is inputted into a vocoder to obtain synthesized speech.

As can be seen, in the technical solution according to the present disclosure, after the prosody feature is extracted from the text, the speech synthesis model obtains the vocoder feature by combining the prosody feature with the text, to allow the vocoder to directly use the vocoder feature to synthesize speech, thereby improving the efficiency of the speech synthesis technology and ensuring a high real-time rate.

The above steps are described in detail below with reference to embodiments. Firstly, step 201 is described in detail.

The to-be-synthesized text involved in the present disclosure may be preset content, for example, startup speech content, welcome speech content, fixed broadcast content in a specific scenario, and so on. For example, when a user terminal is positioned in a new region, "Welcome to AA Region" is broadcast ("AA" indicates a specific region name). In another example, navigation text in a navigation scenario is "Turn left at AAA ahead" ("AAA" indicates a specific building name), and so on.

The to-be-synthesized text may also be text content obtained from a third party, such as news content or article content acquired from the third party.

The to-be-synthesized text may also be text generated in response to speech inputted by a user during interaction with the user. For example, the user inputs speech "Where is AAAA", and broadcast text "AAAA is in No. 3 Jianshe Middle Road" is generated in response to the speech inputted by the user.

Step 202 "acquiring a prosody feature extracted from the text" is described in detail below with reference to embodiments.

In the embodiment of the present disclosure, the prosody feature may be extracted from the text through a prosody prediction model. The prosody prediction model extracts the prosody feature from the text and outputs the prosody feature to a language synthesis model. The language synthesis model outputs the vocoder feature by using the text and the prosody feature.

Figure 3A:
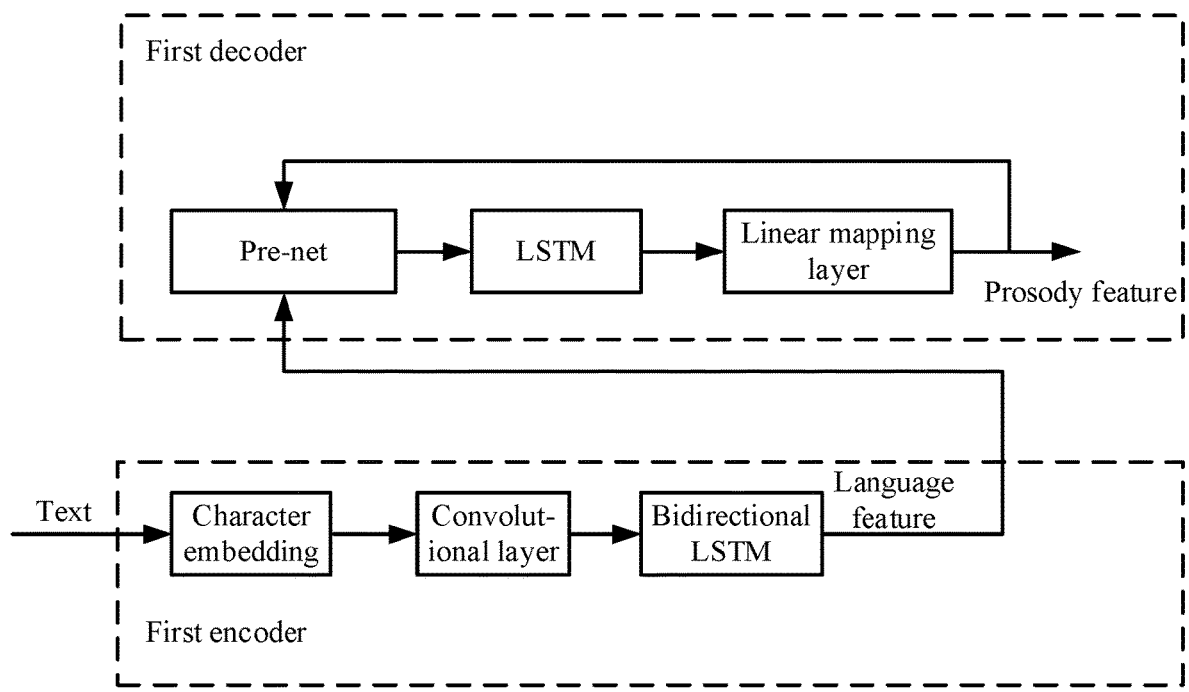
FIG. 3a and FIG. 3b are schematic structural diagrams of a prosody prediction model according to an embodiment of the present disclosure.

The implementation of the prosody prediction model is described in detail below. As shown in FIG. 3a, the prosody prediction model mainly includes a first encoder and a first decoder. It is to be noted herein that the expressions involving "first", "second" and the like in the present disclosure, such as "first encoder", "second encoder", "first decoder", "second decoder", "first threshold" and "second threshold", are intended only to distinguish between names and are not limited in quantity, order, or size, unless otherwise limited.

The first encoder extracts a language feature from the text and then outputs the language feature to the first decoder. The first decoder predicts a prosody feature of a current frame by using a predicted prosody feature of a previous frame and the language feature.

Specifically, text inputted into the first encoder is first processed by character embedding, and then passes through a convolutional layer and a bidirectional long-short term memory (LSTM) layer to obtain the language feature. The second decoder is an auto-regression network. After the predicted prosody feature of the previous frame is first processed by a pre-net, an output result of the pre-net and the language feature are spliced and inputted into an LSTM, and then are processed by a linear prediction layer to obtain the predicted prosody feature.

Figure 3B:
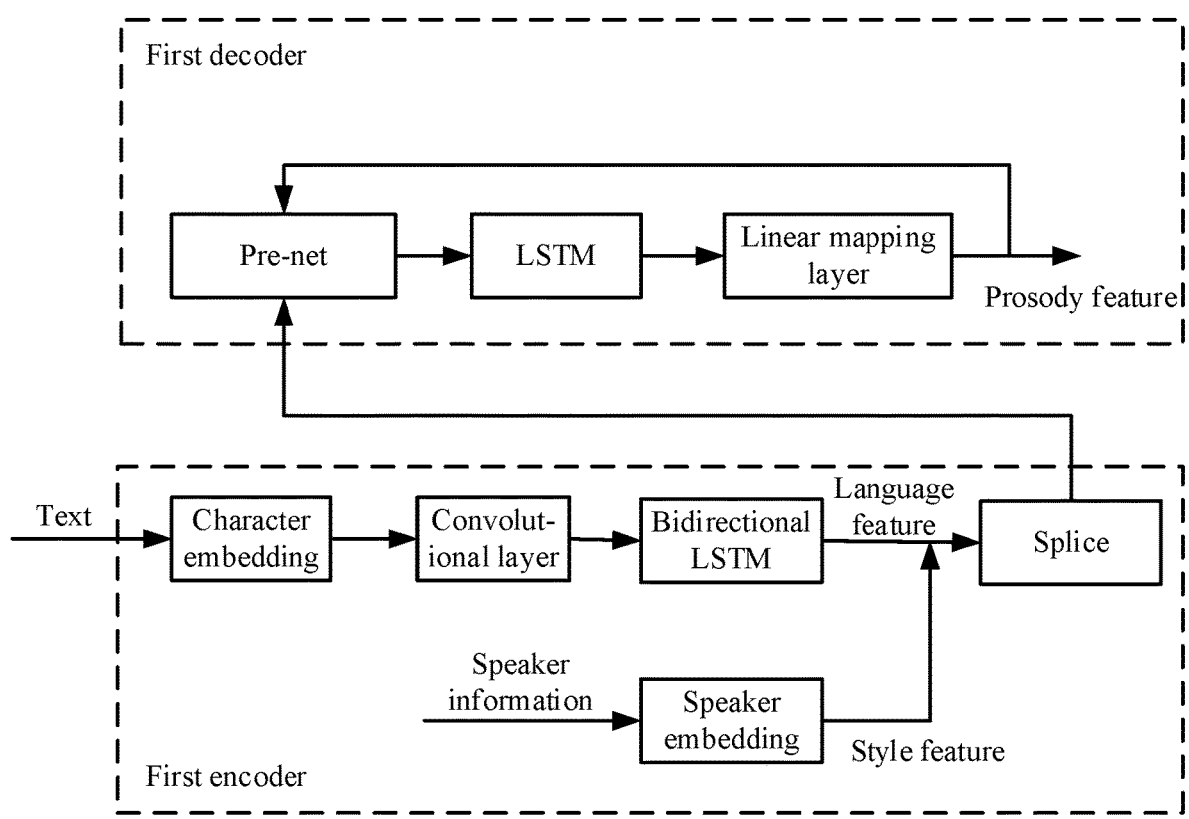

In addition to the above manner, the prosody prediction model may also extract the prosody feature by further combining a broadcast style. The prosody prediction model in this case may have a structure as shown in FIG. 3b. In this case, the first encoder extracts a language feature from the text, splices a broadcast style feature with the language feature, and inputs an obtained first splicing feature into the first decoder. The broadcast style feature may be extracted from speaker information. For example, the speaker information is embedded. The broadcast style feature may also be extracted from text, for example, from semantic information of the text, domain knowledge, etc. (which is not shown in the figure). The first decoder predicts a prosody feature of a current frame by using the predicted prosody feature of the previous frame and the first splicing feature. In this manner, the speech synthesis model is enabled to have speech synthesis capability of various broadcast styles.

The above two structures are two implementations according to the present disclosure. In addition, the prosody feature may also be extracted from the text in other manners.

Step 203 "inputting the text and the prosody feature into a speech synthesis model to obtain a vocoder feature" is described in detail below with reference to embodiments.

Figure 4:
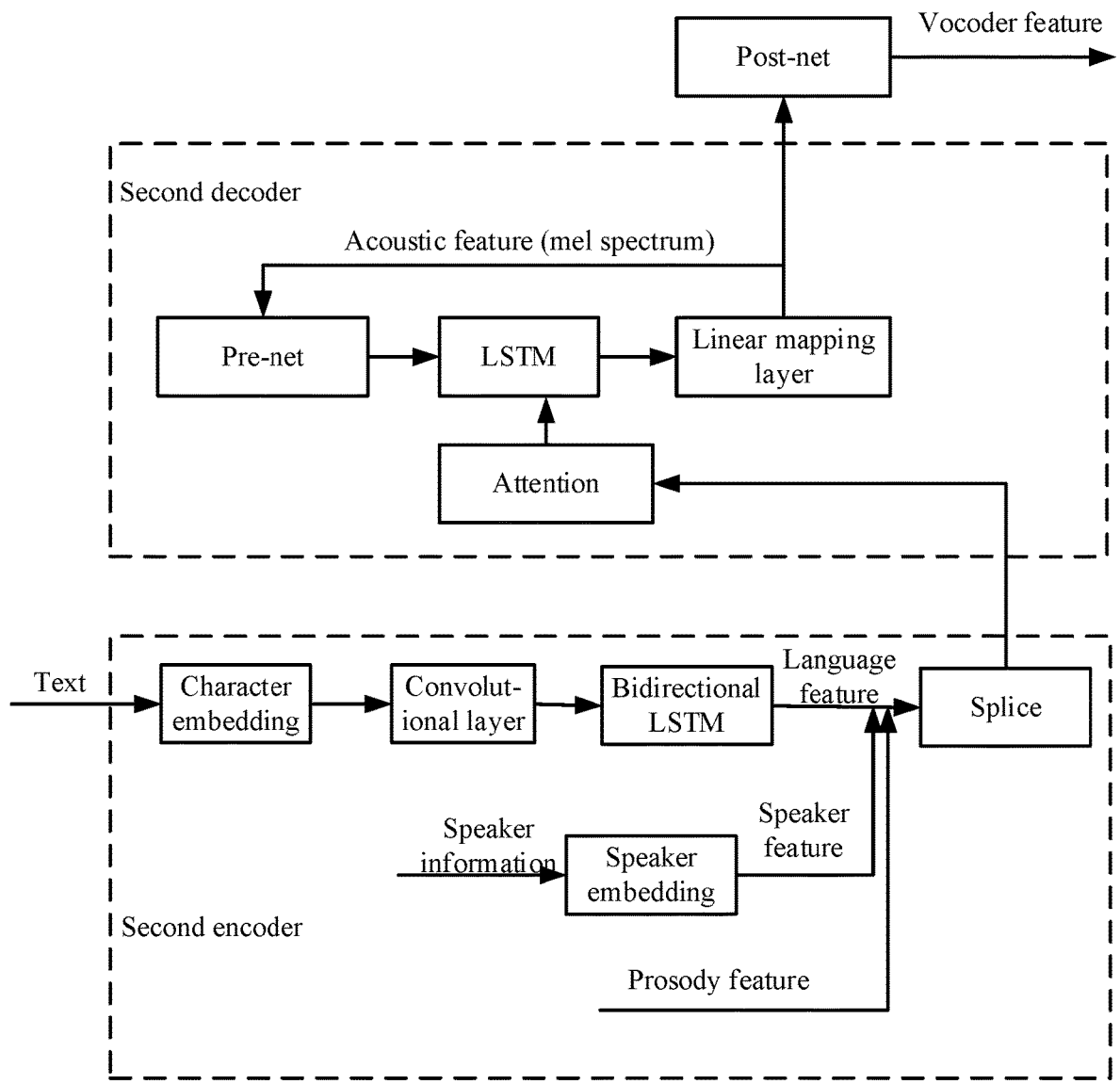
FIG. 4 is a schematic structural diagram of a speech synthesis model according to an embodiment of the present disclosure.

FIG. 4 is a schematic structural diagram of a speech synthesis model according to an embodiment of the present disclosure. As shown in FIG. 4, the speech synthesis model includes a second encoder, a second decoder and a post-net.

The second encoder extracts a language feature from the text, splices the language feature with the prosody feature, or splices the language feature, the prosody feature and a speaker feature, and outputs a second splicing feature obtained by splicing to the second decoder.

The second decoder predicts an acoustic feature of a current frame by using a predicted acoustic feature of a previous frame and the second splicing feature and outputs it to the post-net. The acoustic feature includes a speech spectrum feature.

The post-net predicts the vocoder feature by using the acoustic feature.

As shown in FIG. 4, text inputted into the second encoder is first processed by character embedding, and then passes through a convolutional layer and a bidirectional LSTM layer to obtain a language feature. The language feature is spliced with the prosody feature obtained in step 202, that is, the prosody feature outputted by the prosody prediction model, to obtain the second splicing feature. Furthermore, the speaker feature may also be obtained by embedding the speaker information, and the language feature, the speaker feature and the prosody feature are spliced to obtain the second splicing feature. The preferred manner is shown in FIG. 4.

The second decoder is an auto-regression network. A feature obtained by causing the acoustic feature of the previous frame to pass through the pre-net and the second splicing feature after attention processing are spliced to obtain a third splicing feature. The third splicing feature is processed by an LSTM and inputted into a linear prediction layer, and the linear prediction layer predicts the acoustic feature of the current frame. The acoustic feature involved in the embodiment of the present disclosure includes a speech spectrum feature. The more general and common speech spectrum feature is a mel spectrum.

The second decoder actually uses an auto-regression network for timing prediction to obtain a mel spectrum. The language feature, the prosody feature and the speaker feature of the text in the second encoder are spliced together as a context feature, the predicted mel spectrum of the previous frame is combined with the context feature to predict a mel spectrum of the current frame, and a mel spectrum sequence can be obtained by successive prediction.

Figure 5:
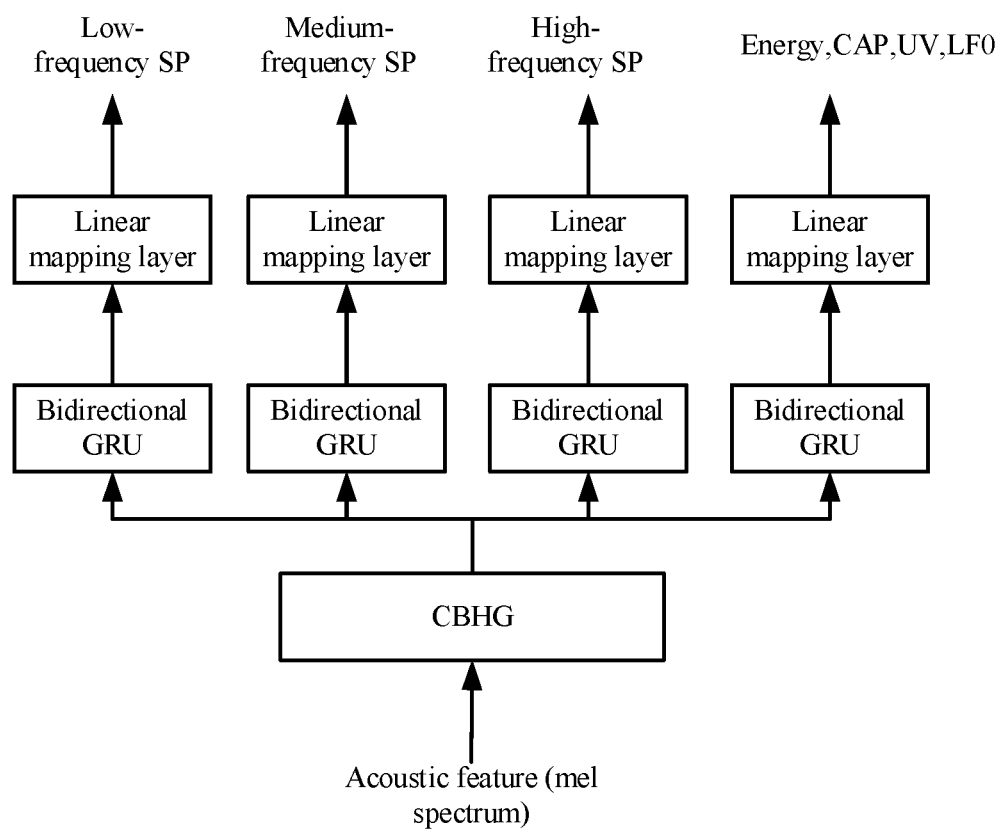
FIG. 5 is a schematic structural diagram of a post-net according to an embodiment of the present disclosure.

The post-net may have a structure as shown in FIG. 5. The post-net causes the acoustic feature to be processed by a Convolution bank+highway network+bidirectional GRU (CBHG) module and then predicted by N prediction modules, and prediction results constitute the vocoder feature. The prediction modules may include a bidirectional Gate Recurrent Unit (GRU) and a linear projection layer. N is a positive integer. For example, N is set to 4, as shown in FIG. 5. A spectral envelope (SP) is divided into high, medium and low frequencies, which are predicted and outputted by one prediction module respectively. Other features, such as an energy feature, a coarse aperiodic parameter (CAP) feature, a logarithmic fundamental frequency (LFO) feature and an unvoiced and voiced (UV) feature, are predicted and outputted by the other prediction modules. All the features finally outputted constitute the vocoder feature.

Step 204 "inputting the vocoder feature into a vocoder to obtain synthesized speech" is described in detail below with reference to embodiments.

As one implementation, the vocoder feature outputted by the speech synthesis model may be directly inputted into the vocoder, and is synthesized by the vocoder into corresponding speech.

As one preferred implementation, before the vocoder feature is inputted into the vocoder, some post-processing may be further performed on the vocoder feature, and then the processed vocoder feature is inputted into the vocoder.

The post-processing may include at least one of linear interpolation, UV correction and inverse normalization.

In some cases, the vocoder has higher synthesis capability than the vocoder feature outputted by the speech synthesis model. For example, a speech synthesis module outputs a vocoder feature with a frame shift of 10 ms, but the sound quality of a feature of 5 ms synthesized by the vocoder is higher than that of the feature of 10 ms. Therefore, the vocoder feature outputted by the speech synthesis model may be linearly interpolated according to a preset interpolation multiple. The interpolation multiple may be preset according to the synthesis capability of the vocoder, which may be set to 2 in the above examples. In this way, the computation of the speech synthesis module can be reduced, and the speech synthesis module of 10 ms achieved by post-processing such as linear interpolation can also achieve a similar effect to the speech synthesis module of 5 ms.

The UV feature is an unvoiced and voiced feature. In the vocoder feature, each frame has a UV feature value to represent a pronunciation characteristic of audio of the frame. For a text, it corresponds to an audio sequence, generally composed of more than one frame, so the UV feature is embodied as a sequence, that is, a UV feature sequence, in the vocoder feature. The UV feature sequence includes UV feature values of various frames.

The UV feature values include 0 and 1, wherein 0 represents Unvoiced, and 1 represents Voiced.

The UV feature is predicted according to a classification probability when the speech synthesis model predicts the vocoder feature, which may have some errors. The errors may result in that distribution of vowels and consonants do not conform to rules of pronunciation, and the speech synthesis effect is poor.

A process of UV correction is described in detail below with reference to embodiments. Specifically, a value change boundary of a UV feature sequence in the vocoder feature may be corrected according to the energy feature in the vocoder feature. The values of the UV feature sequence may also be determined and corrected according to a speech spectrum feature. Alternatively, the value change boundary of the UV feature sequence in the vocoder feature is corrected according to the energy feature in the vocoder feature, and the values of the UV feature sequence are determined and corrected according to the speech spectrum feature.

Figure 6:
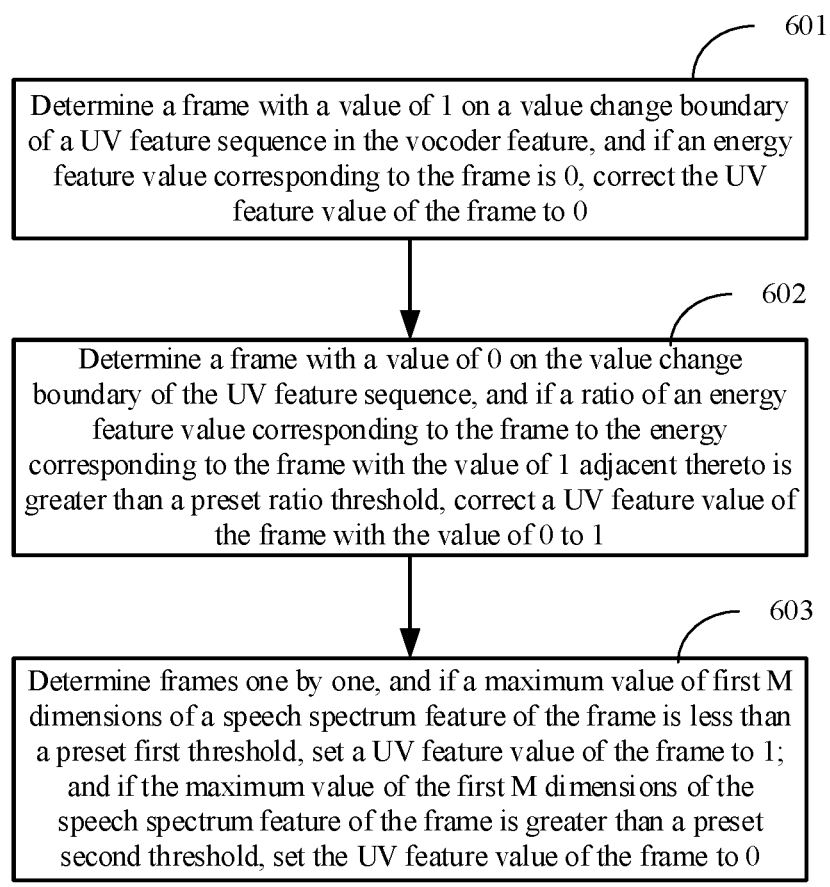
FIG. 6 is a flowchart of a UV correction method according to an embodiment of the present disclosure.

Description is given below through one preferred implementation by taking the above two manners as examples. As shown in FIG. 6, UV correction may specifically include the following steps.

In 601, a frame with a value of 1 on a value change boundary of a UV feature sequence in the vocoder feature is determined, and if an energy feature value corresponding to the frame is 0, the UV feature value of the frame is corrected to 0.

As mentioned above, the vocoder feature includes an energy feature. In this step, firstly, the frame with the value of 1 on the value change boundary of the UV feature sequence is determined by using the energy feature in the vocoder.

The so-called "frame with a value of 1 on a value change boundary" means that, when values of 0 and 1 are adjacent in the UV feature sequence, it is considered as a value change boundary, and then a frame with the value of 1 in the adjacent values of 0 and 1 is determined.

The "frame with a value of 1" means that the frame is recognized as a voiced sound by the speech synthesis model. Voiced sounds are sounds in which vocal cords vibrate during the pronunciation. Unvoiced sounds are sounds in which the vocal cords do not vibrate during the pronunciation. In general, the voiced sounds sound louder than the unvoiced sounds, and the unvoiced sounds typically have an energy feature value of less than 0 in the vocoder feature. Therefore, if an energy feature value corresponding to a frame with a value of 1 on the value change boundary of the UV feature sequence is less than 0, the frame is likely to be unvoiced, and its UV feature value is corrected to 0. If the corresponding energy feature value is greater than or equal to 0, the UV feature value of the frame remains unchanged.

In this step, all frames with the value of 1 on the value boundary of the UV feature sequence may be determined. If a new value boundary is generated after the correction of UV feature values, frames with a value of 1 on the new value boundary are also required to be determined. For example, a fragment in an original UV feature sequence is " . . . 0, 1, 1 . . . ". After 1 on the boundary of 0, 1 is determined and corrected to 0, the value 0 and the subsequent value 1 constitute a new value boundary, and then the above determination is continued for frames corresponding to the subsequent value 1.

In 602, a frame with a value of 0 on the value change boundary of the UV feature sequence is determined, and if a ratio of an energy feature value corresponding to the frame to the energy corresponding to the frame with the value of 1 adjacent thereto is greater than a preset ratio threshold, a UV feature value of the frame with the value of 0 is corrected to 1.

The "frame with a value of 0" means that the frame is recognized as an unvoiced sound by the speech synthesis model. For different users, energy values may vary during the pronunciation. However, there is a distinction between the voiced and unvoiced sounds. If a ratio of the energy corresponding to a frame with a value of 0 to the energy corresponding to a frame with a value of 1 on the value change boundary is greater than a preset ratio threshold (e.g., 50%), that is, the frame does not differ much from the voiced sound adjacent thereto, it is considered that the frame may also be a voiced sound. Therefore, the UV feature value of the frame is corrected to 1. Otherwise, the UV feature value of the frame remains unchanged.

In this step, all frames with the value of 0 on the value boundary of the UV feature sequence may be determined. If a new value boundary is generated after the correction of UV feature values, frames with a value of 0 on the new value boundary are also required to be determined. For example, a fragment in an original UV feature sequence is " . . . 1, 0, 0 . . . ". After 0 on the boundary of 1, 0 is determined and corrected to 1, the value 1 and the subsequent value 0 constitute a new value boundary, and then the above determination is continued for frames corresponding to the subsequent value 0. In this step, n is set as a parameter, at most n consecutive frames are determined forward or backward at a value boundary, and even if a new value boundary is still generated after the n frames, determination and correction may not be continued. n is a preset positive integer, for example, 8. Different people have different pronunciation habits, so different values of n may be set for different speakers.

In 603, frames are determined one by one, and if a maximum value of first M dimensions of a speech spectrum feature of the frame is less than a preset first threshold, a UV feature value of the frame is set to 1; and if the maximum value of the first M dimensions of the speech spectrum feature of the frame is greater than a preset second threshold, the UV feature value of the frame is set to 0.

M is a preset positive integer, for example, 20. The second threshold is greater than the first threshold. For example, the first threshold is 2, and the second threshold is 2.5.

In addition to the vocoder feature, the speech synthesis model may also output an acoustic feature corresponding to the text, including a speech spectrum feature. The more general and common speech spectrum feature is a mel spectrum.

Taking the mel spectrum as an example, the value of the mel spectrum is between 0 and 4. After observation and research, it is found that values of first 20 dimensions of a mel spectrum corresponding to a voiced sound is relatively large, while values of first 20 dimensions of a mel spectrum corresponding to an unvoiced sound is relatively small. Therefore, if a maximum value of the first 20 dimensions of the mel spectrum is less than 2, the frame is likely to be voiced, so the UV feature value of the frame is set to 1. If the UV feature value of the frame is 1, it remains the same, and if it is 0, it is corrected to 1. If the maximum value of the first 20 dimensions of the mel spectrum is greater than 2.5, the frame is likely to be unvoiced, so the UV feature value of the frame is set to 0.

If the maximum value of the first 20 dimensions of the mel spectrum is greater than or equal to 2 and less than or equal to 2.5, the UV feature value of the frame remains unchanged.

The execution sequence used in the embodiment shown in FIG. 6 is a preferred execution sequence, and an optimal UV correction effect can be achieved. However, the present disclosure is not limited to the above execution steps and execution sequence. If only some or all of the steps are performed, or other execution sequences are adopted, they also fall within the protection scope of the present disclosure.

Generally, in the case of training of the speech synthesis model, in order to reduce the difficulty and accuracy of the model training, some types of features may be normalized during the training. The normalization may be specific to different speakers or different broadcast styles. However, during actual speech synthesis, the normalized vocoder feature outputted by the speech synthesis model may affect an effect of speech finally synthesized by the vocoder. Therefore, in the present disclosure, a preset type of feature sequences in the corrected vocoder feature may be further inversely normalized. The inversely normalizing corresponds to normalizing the preset type of feature sequences during the training of the speech synthesis model.

In addition, variance and mean may also be adjusted appropriately to improve the effect of high frequency energy and fundamental frequency. The adjustment on the variance enables finally synthesized speech to be more penetrating, and the adjustment on the mean enables the finally synthesized speech to be louder and clearer.

After the vocoder feature processed above is provided for the vocoder for speech synthesis, the quality of the synthesized speech can be greatly improved. The type of the vocoder used in step 204 is not limited in the present disclosure, which may be a world vocoder or the like.

Through the above speech synthesis and post-processing methods, a high real-time rate and small computation of speech synthesis can be guaranteed, thereby providing a basis for offline speech synthesis. In addition, the experimental verification shows that an error rate of the speech synthesis method is less than 3 in 1000, which is suitable for mobile phone offline map navigation scenarios with low resource requirements.

Figure 7A:
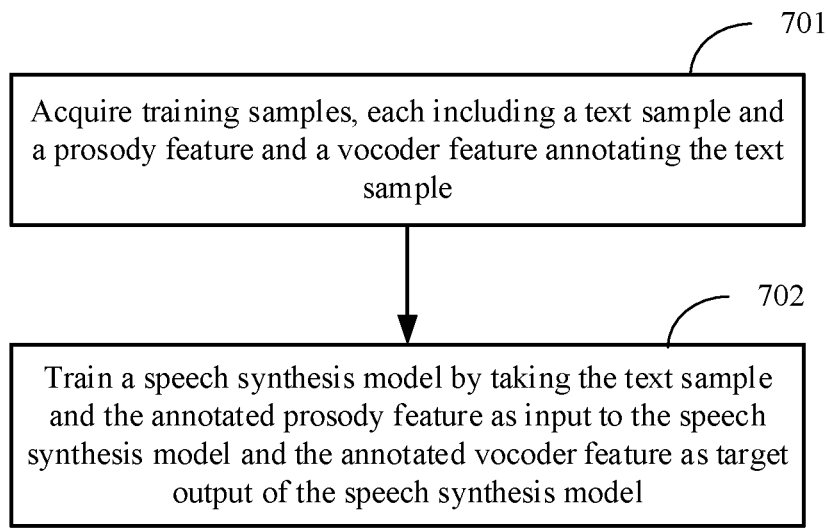
FIG. 7a is a flowchart of a first speech synthesis model training method according to an embodiment of the present disclosure.

A speech synthesis model training method is described in detail below with reference to embodiments. FIG. 7a is a flowchart of a first speech synthesis model training method according to an embodiment of the present disclosure. As shown in FIG. 7a, the method may include the following steps.

In 701, training samples are acquired, each including a text sample and a prosody feature and a vocoder feature annotating the text sample.

In this embodiment, the manner of acquiring the training samples may start from speech. For example, speech of some specific speakers or specific styles may be acquired as standard speech. After the standard speech is recognized, a speech recognition result is taken as a text sample. Text corresponding to the standard speech may also be recognized manually, and the text is taken as a text sample.

Then, a vocoder feature and a prosody feature are extracted from the standard speech, and the text sample is annotated by using the extracted vocoder feature and prosody feature. It is a mature technology to extract a vocoder feature and a prosody feature from speech, which is not described in detail herein.

In 702, a speech synthesis model is trained by taking the text sample and the annotated prosody feature as input to the speech synthesis model and the annotated vocoder feature as target output of the speech synthesis model.

Figure 7B:
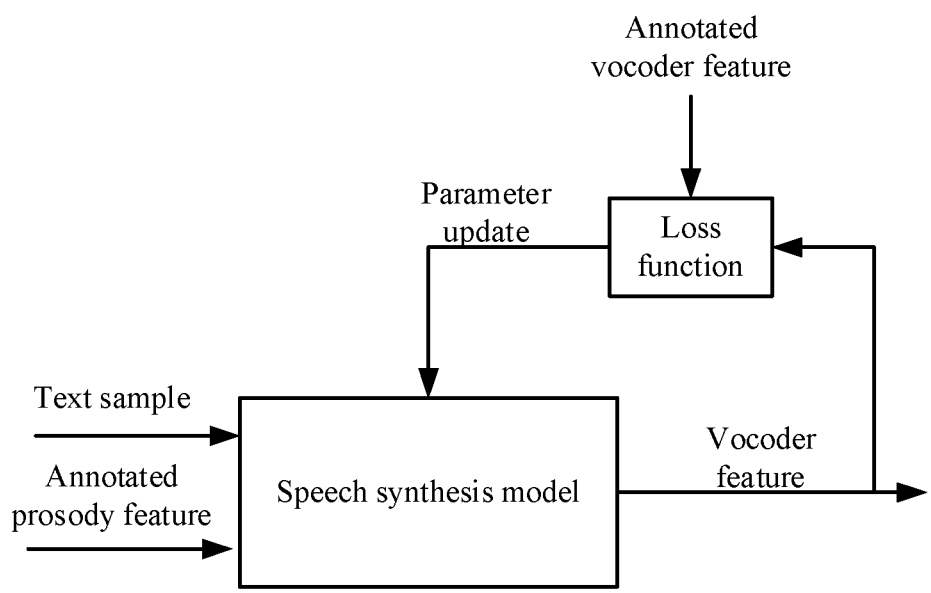
FIG. 7b is a schematic structural diagram of a first speech synthesis model training architecture according to an embodiment of the present disclosure.

This training manner is as shown in FIG. 7b, which actually annotates both the prosody feature and the vocoder feature of the text sample. During the training, the text sample and the prosody feature are inputted into the speech synthesis model in each iteration. After outputting a predicted vocoder feature, the speech synthesis model takes minimizing a difference between the predicted vocoder feature and the annotated vocoder feature as a training objective. Specifically, a loss function may be pre-designed using a learning objective, and then model parameters of the speech synthesis model may be updated iteratively by means of gradient descent until an iteration stop condition is reached. The iteration stop condition may be such as convergence of the model parameters, the value of the loss function meeting a preset requirement, or a preset iteration number threshold being reached.

The speech synthesis model still has the structure shown in FIG. 4. During the training in this embodiment, the second encoder in the speech synthesis model extracts a language feature from the text sample, splices the language feature with the annotated prosody feature, or splices the language feature, the prosody feature and a speaker feature (the speaker feature is extracted from the standard speech), and outputs a second splicing feature obtained by splicing to the second decoder.

The second decoder predicts an acoustic feature of a current frame by using a predicted acoustic feature of a previous frame and the second splicing feature and outputs it to the post-net. The acoustic feature includes a speech spectrum feature, for example, a mel spectrum.

The post-net predicts the vocoder feature by using the acoustic feature. The post-net has a structure as shown in FIG. 5. The post-net causes the acoustic feature to be processed by a CBHG module and then predicted by N prediction modules, and prediction results constitute the vocoder feature. The prediction modules include a bidirectional GRU and a linear projection layer. N is a positive integer, for example, 4. The SP is divided into high, medium and low frequencies, which are predicted and outputted by one prediction module respectively. Other features, such as the energy feature, the CAP feature, the LFO feature and the UV feature, are predicted and outputted by the other prediction modules. All the features finally outputted constitute the vocoder feature.

The speech synthesis model obtained after the training may be used in the above embodiment of the speech synthesis method to extract a vocoder feature from to-be-synthesized text.

Figure 8A:
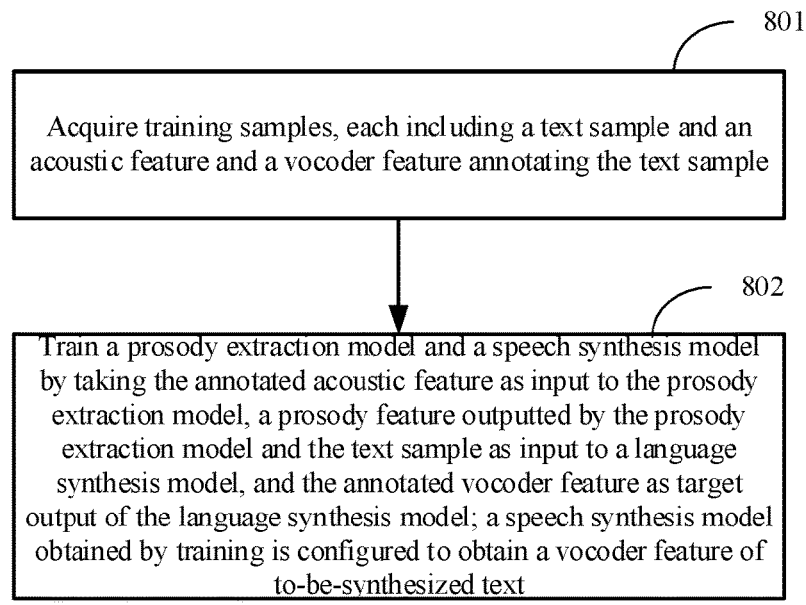
FIG. 8a is a flowchart of a second speech synthesis model training method according to an embodiment of the present disclosure.

FIG. 8a is a flowchart of a second speech synthesis model training method according to an embodiment of the present disclosure. As shown in FIG. 8a, the method may include the following steps.

In 801, training samples are acquired, each including a text sample and an acoustic feature and a vocoder feature annotating the text sample.

Similarly to the above embodiment, the manner of acquiring the training samples in this embodiment may start from speech. For example, speech of some specific speakers or specific styles may be acquired as standard speech. After the standard speech is recognized, a speech recognition result is taken as a text sample. Text corresponding to the standard speech may also be recognized manually, and the text is taken as a text sample.

Then, a vocoder feature and an acoustic feature are extracted from the standard speech, and the text sample is annotated by using the extracted vocoder feature and acoustic feature. It is a mature technology to extract a vocoder feature and an acoustic feature from speech, which is not described in detail herein.

In 802, a prosody extraction model and a speech synthesis model are trained by taking the annotated acoustic feature as input to the prosody extraction model, a prosody feature outputted by the prosody extraction model and the text sample as input to a language synthesis model, and the annotated vocoder feature as target output of the language synthesis model; a speech synthesis model obtained by training is configured to obtain a vocoder feature of to-be-synthesized text.

Figure 8B:
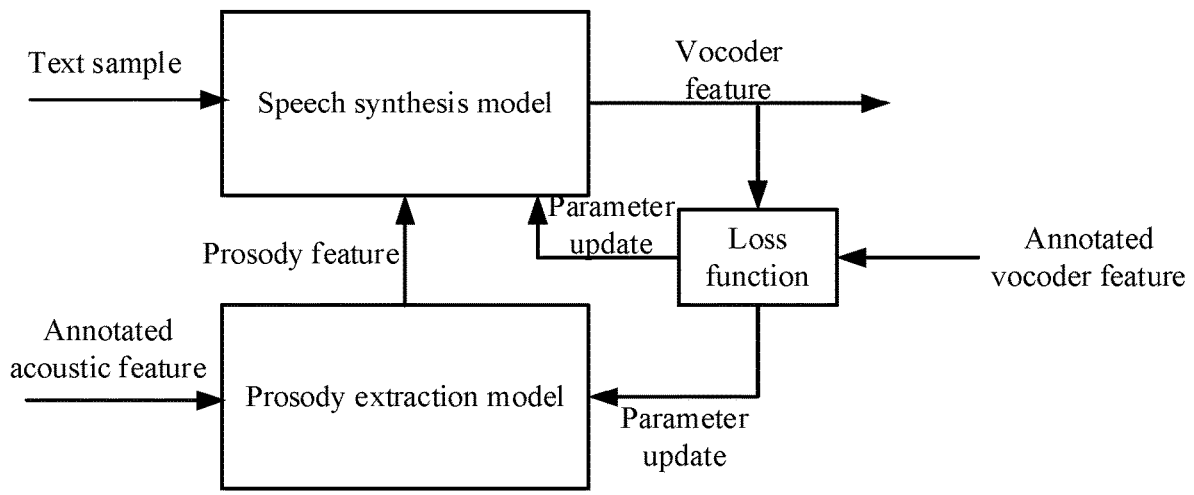
FIG. 8b is a schematic structural diagram of a second speech synthesis model training architecture according to an embodiment of the present disclosure.

In this embodiment, the prosody extraction model is used for auxiliary training during the training of the speech synthesis model. The prosody extraction model can output the prosody feature in the case of inputting the acoustic feature. As shown in FIG. 8b, both the acoustic feature and the vocoder feature of the text sample are actually annotated. During the training, in each iteration, the annotated acoustic feature is inputted into the prosody extraction model, and the prosody feature outputted by the prosody extraction model and the text sample are inputted into the speech synthesis model. After outputting a predicted vocoder feature, the speech synthesis model takes minimizing a difference between the predicted vocoder feature and the annotated vocoder feature as a training objective. Specifically, a loss function may be pre-designed using a learning objective, and then model parameters of the speech synthesis model and the prosody extraction model may be updated iteratively by means of gradient descent until an iteration stop condition is reached. The iteration stop condition may be such as convergence of the model parameters, the value of the loss function meeting a preset requirement, or a preset iteration number threshold being reached.

Figure 8C:
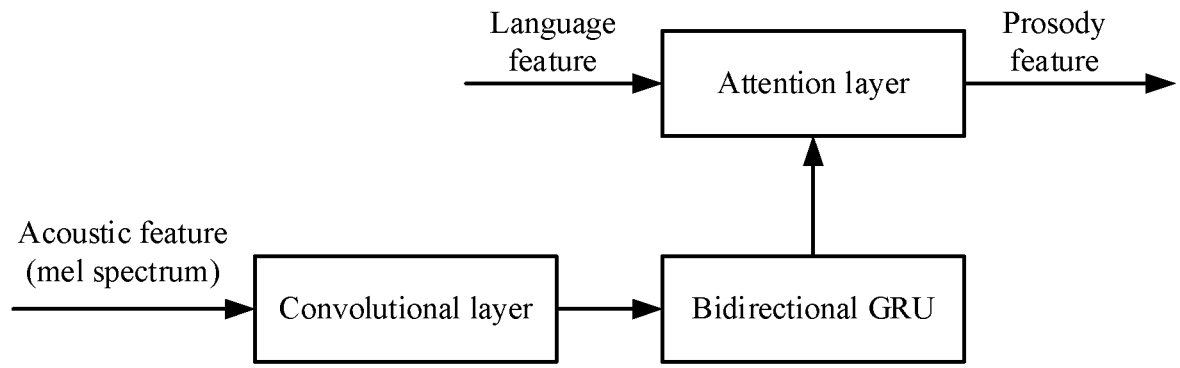
FIG. 8c is a schematic structural diagram of a prosody extraction model according to an embodiment of the present disclosure.

The structure and principle of the speech synthesis model are the same as those of the previous embodiment, which are not described in detail. The structure of the prosody extraction model is described below. FIG. 8c is a schematic structural diagram of a prosody extraction model according to an embodiment of the present disclosure. As shown in FIG. 8c, the prosody extraction model includes: a convolutional layer, a bidirectional GRU layer and an attention layer.

After the annotated acoustic feature, for example, the mel spectrum, passes through the convolutional layer and the bidirectional GRU layer, a feature outputted by the bidirectional GRU layer and a language feature extracted by the second encoder in the speech synthesis model are inputted into the attention layer for attention processing to obtain a prosody feature.

During the above training, the prosody extraction model and the speech synthesis model are jointly trained, and a speech synthesis model finally trained is configured to obtain a vocoder feature of to-be-synthesized text.

Figure 9A:
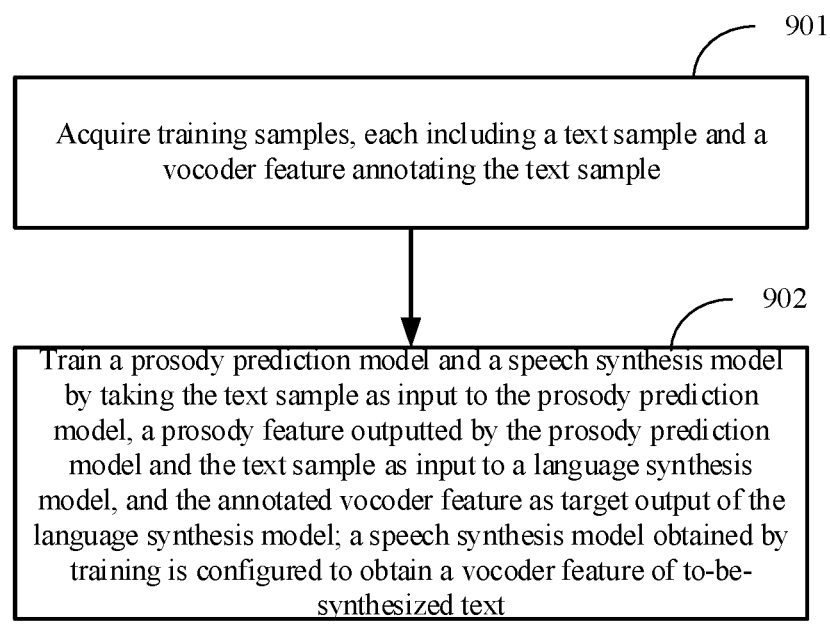
FIG. 9a is a flowchart of a third speech synthesis model training method according to an embodiment of the present disclosure.

FIG. 9a is a flowchart of a third speech synthesis model training method according to an embodiment of the present disclosure. As shown in FIG. 9a, the method may include the following steps.

In 901, training samples are acquired, each including a text sample and a vocoder feature annotating the text sample.

Similarly to the above embodiment, the manner of acquiring the training samples in this embodiment may start from speech. For example, speech of some specific speakers or specific styles may be acquired as standard speech. After the standard speech is recognized, a speech recognition result is taken as a text sample. Text corresponding to the standard speech may also be recognized manually, and the text is taken as a text sample.

Then, a vocoder feature is extracted from the standard speech, and the text sample is annotated by using the extracted vocoder feature. It is a mature technology to extract a vocoder feature from speech, which is not described in detail herein.

In 902, a prosody prediction model and a speech synthesis model are trained by taking the text sample as input to the prosody prediction model, a prosody feature outputted by the prosody prediction model and the text sample as input to a language synthesis model, and the annotated vocoder feature as target output of the language synthesis model; a speech synthesis model obtained by training is configured to obtain a vocoder feature of to-be-synthesized text.

Figure 9B:
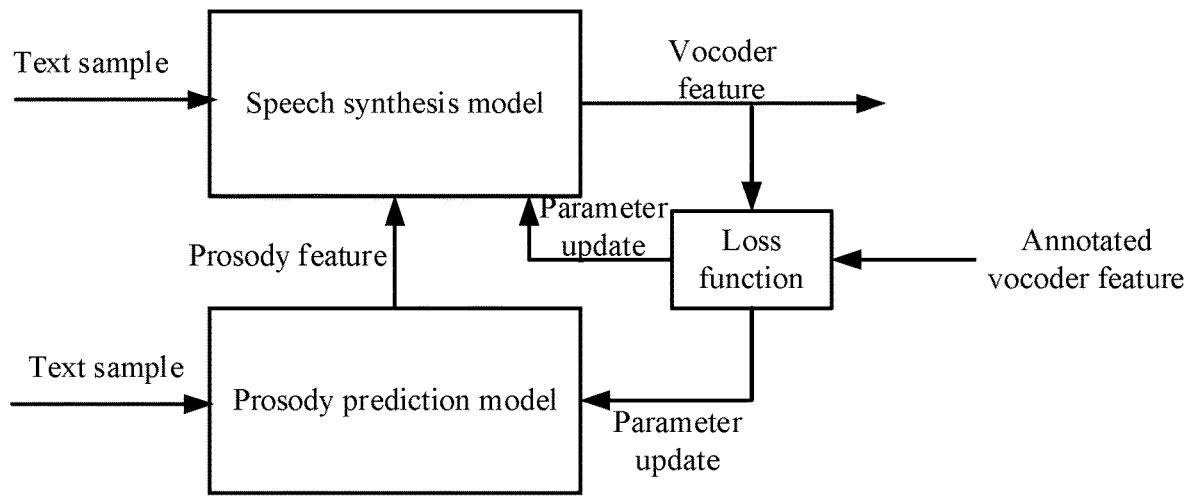
FIG. 9b is a schematic structural diagram of a third speech synthesis model training architecture according to an embodiment of the present disclosure.

In this embodiment, the prosody prediction model is used for joint training during the training of the speech synthesis model. The prosody prediction model can output the prosody feature in the case of inputting text. As shown in FIG. 9b, only the vocoder feature of the text sample is annotated. During the training, the text sample is inputted into the prosody prediction model and the speech synthesis model in each iteration. The prosody feature outputted by the prosody prediction model is also inputted into the speech synthesis model. The speech synthesis model outputs a predicted vocoder feature in the case of inputting text and a prosody feature, and takes minimizing a difference between the predicted vocoder feature and the annotated vocoder feature as a training objective. Specifically, a loss function may be pre-designed using a learning objective, and then model parameters of the speech synthesis model and the prosody prediction model may be updated iteratively by means of gradient descent until an iteration stop condition is reached. The iteration stop condition may be such as convergence of the model parameters, the value of the loss function meeting a preset requirement, or a preset iteration number threshold being reached.

The structure and principle of the speech synthesis model are the same as those of the previous embodiment. The structure and principle of the prosody prediction model are as shown in FIG. 3a and FIG. 3b, including a first encoder and a first decoder.

The first encoder extracts a language feature from the text sample and then outputs the language feature to the first decoder. The first decoder predicts a prosody feature of a current frame by using a predicted prosody feature of a previous frame and the language feature.

Specifically, a text sample inputted into the first encoder is first processed by character embedding, and then passes through a convolutional layer and a bidirectional LSTM layer to obtain the language feature. The second decoder is an auto-regression network. After the predicted prosody feature of the previous frame is first processed by a pre-net, an output result of the pre-net and the language feature are spliced and inputted into an LSTM, and then are processed by a linear prediction layer to obtain the predicted prosody feature.

Alternatively, the first decoder extracts a language feature from the text sample, splices a broadcast style feature extracted from the text sample with the language feature, and inputs an obtained first splicing feature into the first decoder; and the first decoder predicts a prosody feature of a current frame by using a predicted prosody feature of a previous frame and the first splicing feature.

During the above training, the prosody prediction model and the speech synthesis model are jointly trained, and a speech synthesis model finally trained is configured to obtain a vocoder feature of to-be-synthesized text.

Figure 10A:
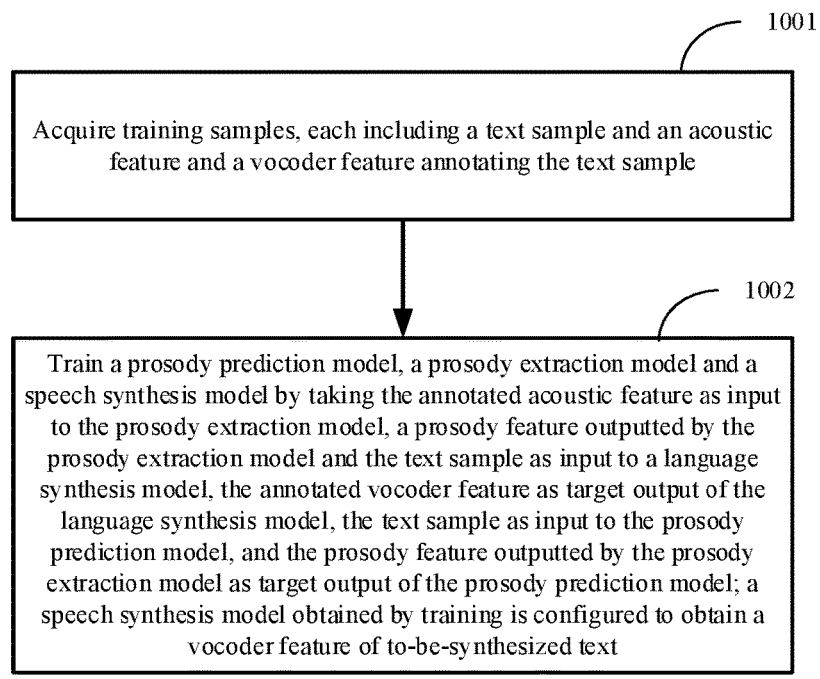
FIG. 10a is a flowchart of a fourth speech synthesis model training method according to an embodiment of the present disclosure.

FIG. 10a is a flowchart of a fourth speech synthesis model training method according to an embodiment of the present disclosure. As shown in FIG. 10a, the method may include the following steps.

In 1001, training samples are acquired, each including a text sample and an acoustic feature and a vocoder feature annotating the text sample.

Similarly to the above embodiment, the manner of acquiring the training samples in this embodiment may start from speech. For example, speech of some specific speakers or specific styles may be acquired as standard speech. After the standard speech is recognized, a speech recognition result is taken as a text sample. Text corresponding to the standard speech may also be recognized manually, and the text is taken as a text sample.

Then, a vocoder feature and an acoustic feature are extracted from the standard speech, and the text sample is annotated by using the extracted vocoder feature and acoustic feature. It is a mature technology to extract a vocoder feature and an acoustic feature from speech, which is not described in detail herein.

In 1002, a prosody prediction model, a prosody extraction model and a speech synthesis model are trained by taking the annotated acoustic feature as input to the prosody extraction model, a prosody feature outputted by the prosody extraction model and the text sample as input to a language synthesis model, the annotated vocoder feature as target output of the language synthesis model, the text sample as input to the prosody prediction model, and the prosody feature outputted by the prosody extraction model as target output of the prosody prediction model; a speech synthesis model obtained by training is configured to obtain a vocoder feature of to-be-synthesized text.

Figure 10B:
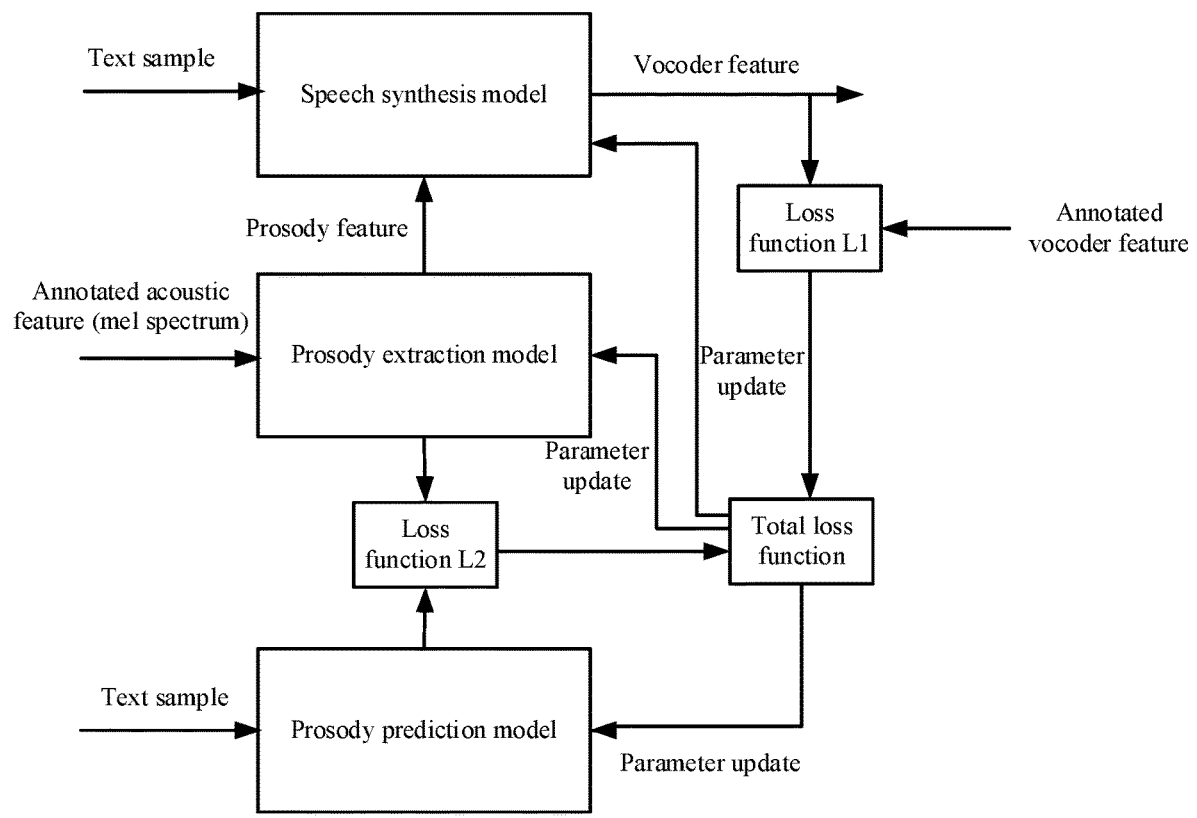
FIG. 10b is a schematic structural diagram of a fourth speech synthesis model training architecture according to an embodiment of the present disclosure.

In this embodiment, the prosody extraction model and the prosody prediction model are used for joint training during the training of the speech synthesis model. The prosody extraction model outputs the prosody feature in the case of inputting the annotated acoustic feature. The prosody prediction model can output the prosody feature in the case of inputting the text sample. As shown in FIG. 10b, both the vocoder feature and the acoustic feature of the text sample are required to be annotated. During the training, in each iteration, the text sample is inputted into the prosody prediction model and the speech synthesis model, and the annotated acoustic feature is inputted into the prosody extraction model. The prosody feature outputted by the prosody extraction model is also inputted into the speech synthesis model. The speech synthesis model outputs a predicted vocoder feature in the case of inputting text and a prosody feature, and takes minimizing a difference between the predicted vocoder feature and the annotated vocoder feature and minimizing a difference between a prosody feature predicted by the prosody prediction model and a prosody feature extracted by the prosody extraction model as training objectives. Specifically, two loss functions may be pre-designed using learning objectives. That is, a loss function L1 is constructed by minimizing the difference between the predicted vocoder feature and the annotated vocoder feature, and a loss function L2 is constructed by minimizing the difference between the prosody feature predicted by the prosody prediction model and the prosody feature extracted by the prosody extraction model. A total loss function is constructed by using L1 and L2. Model parameters of the speech synthesis model and the prosody prediction model are updated iteratively based on the total loss function by means of gradient descent until an iteration stop condition is reached. The iteration stop condition may be such as convergence of the model parameters, the value of the loss function meeting a preset requirement, or a preset iteration number threshold being reached.

The above speech synthesis model has low requirements on training data, and generally can achieve commercial stability, expressiveness and fluency through hundreds of sentences.

The above is a detailed description of the method according to the present disclosure. The following is a detailed description of the apparatus according to the present disclosure with reference to embodiments.

Figure 11:
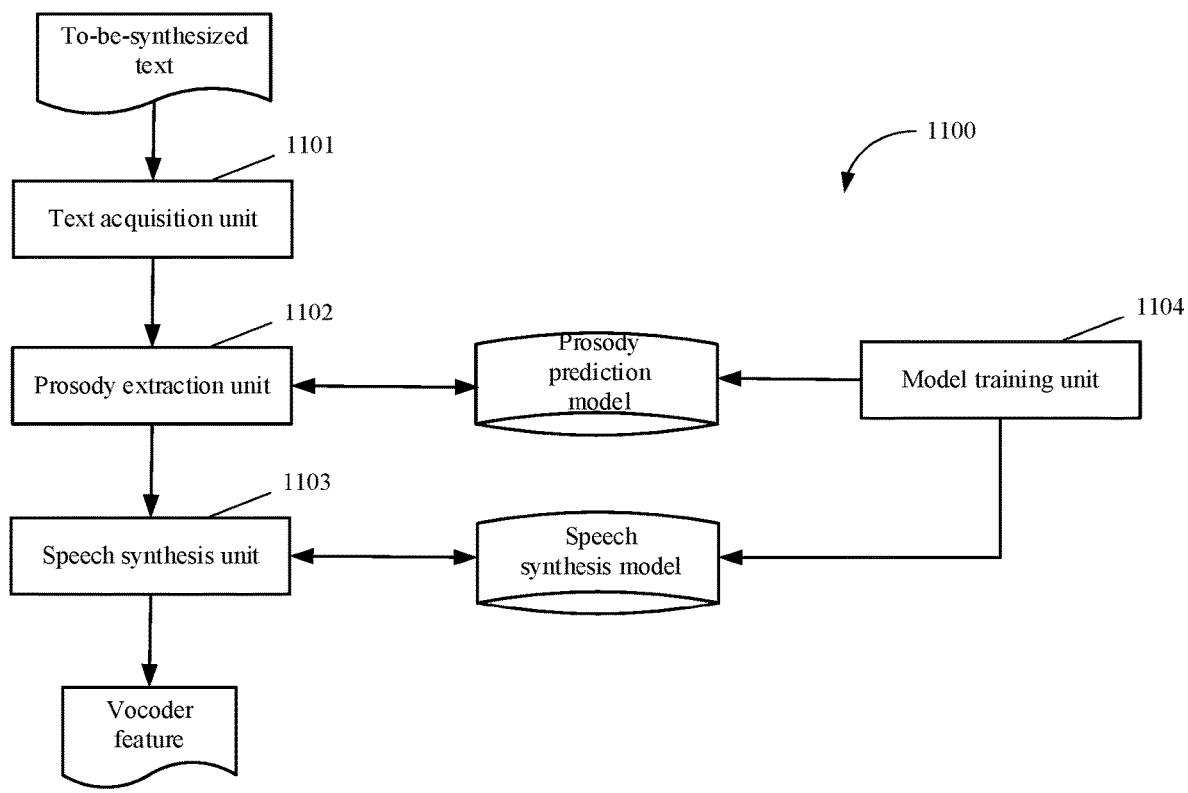
FIG. 11 is a schematic structural diagram of a speech synthesis apparatus according to an embodiment of the present disclosure.

FIG. 11 is a schematic structural diagram of a speech synthesis apparatus according to an embodiment of the present disclosure, i.e., the speech synthesis apparatus shown in FIG. 1. As shown in FIG. 11, the apparatus 1100 may include: a text acquisition unit 1101, a prosody extraction unit 1102 and a speech synthesis unit 1103, and may further include a model training unit 1104. Main functions of the component units are as follows.

The text acquisition unit 1101 is configured to acquire to-be-synthesized text.

The prosody extraction unit 1102 is configured to acquire a prosody feature extracted from the text.

The speech synthesis unit 1103 is configured to input the text and the prosody feature into a speech synthesis model to obtain a vocoder feature; and input the vocoder feature into a vocoder to obtain synthesized speech.

The prosody extraction unit 1102 is specifically configured to input the text into a prosody prediction model to obtain the prosody feature. The prosody prediction model includes a first encoder and a first decoder.

As one implementation, the first encoder is configured to extract a language feature from text and output the language feature to the first decoder. The first decoder predicts a prosody feature of a current frame by using a predicted prosody feature of a previous frame and the language feature.

In another implementation, the first decoder is configured to extract a language feature from text, splice a broadcast style feature extracted from the text with the language feature, and input an obtained first splicing feature into the first decoder; and the first decoder predicts a prosody feature of a current frame by using a predicted prosody feature of a previous frame and the first splicing feature.

The speech synthesis model may include a second encoder, a second decoder and a post-net.

The second encoder is configured to extract a language feature from the text, splice the language feature with the prosody feature, or splice the language feature, the prosody feature and a speaker feature, and output a second splicing feature obtained by splicing to the second decoder.

The second decoder is configured to predict an acoustic feature of a current frame by using a predicted acoustic feature of a previous frame and the second splicing feature and output it to the post-net; wherein the acoustic feature includes a speech spectrum feature.

The post-net is configured to predict the vocoder feature by using the acoustic feature.

As one implementation, the second decoder splices a feature obtained by causing the acoustic feature of the previous frame to pass through the pre-net and the second splicing feature after attention processing, to obtain a third splicing feature. The third splicing feature is processed by an LSTM and inputted into a linear prediction layer. The linear prediction layer predicts the acoustic feature of the current frame.

As one implementation, the post-net may cause the acoustic feature to be processed by a CBHG module and then predicted by N prediction modules, and prediction results constitute the vocoder feature. The prediction modules include a bidirectional GRU and a linear projection layer. N is a positive integer.

The model training unit 1104 may be trained in, but not limited to, the following manners.

In the first training manner, the model training unit 1104 acquires training samples, each including a text sample and a prosody feature and a vocoder feature annotating the text sample; and trains a speech synthesis model by taking the text sample and the annotated prosody feature as input to the speech synthesis model and the annotated vocoder feature as target output of the speech synthesis model.

In the second training manner, the model training unit 1104 acquires training samples, each including a text sample and an acoustic feature and a vocoder feature annotating the text sample; and trains a prosody extraction model and a speech synthesis model by taking the annotated acoustic feature as input to the prosody extraction model, a prosody feature outputted by the prosody extraction model and the text sample as input to a language synthesis model, and the annotated vocoder feature as target output of the language synthesis model.

In the third training manner, the model training unit 1104 acquires training samples, each including a text sample and a vocoder feature annotating the text sample; and trains a prosody prediction model and a speech synthesis model by taking the text sample as input to the prosody prediction model, a prosody feature outputted by the prosody prediction model and the text sample as input to a language synthesis model, and the annotated vocoder feature as target output of the language synthesis model.

In the fourth training manner, the model training unit 1104 acquires training samples, each including a text sample and an acoustic feature and a vocoder feature annotating the text sample; and trains a prosody prediction model, a prosody extraction model and a speech synthesis model by taking the annotated acoustic feature as input to the prosody extraction model, a prosody feature outputted by the prosody extraction model and the text sample as input to a language synthesis model, the annotated vocoder feature as target output of the language synthesis model, the text sample as input to the prosody prediction model, and the prosody feature outputted by the prosody extraction model as target output of the prosody prediction model.

The prosody extraction model involved in the second training manner and the fourth training manner may include: a convolutional layer, a bidirectional GRU layer and an attention layer.

After the annotated acoustic feature passes through the convolutional layer and the bidirectional GRU layer, an obtained feature and a language feature extracted by the second encoder in the speech synthesis model are inputted into the attention layer for attention processing, to obtain a prosody feature.

In the above four manners, the model training unit 1104 may acquire standard speech and determine text corresponding to the standard speech as the text sample. At least one of the acoustic feature and the vocoder feature are extracted from the standard speech, and annotated with the text sample. The prosody feature is extracted from the text sample to annotate the text sample.

Figure 12:
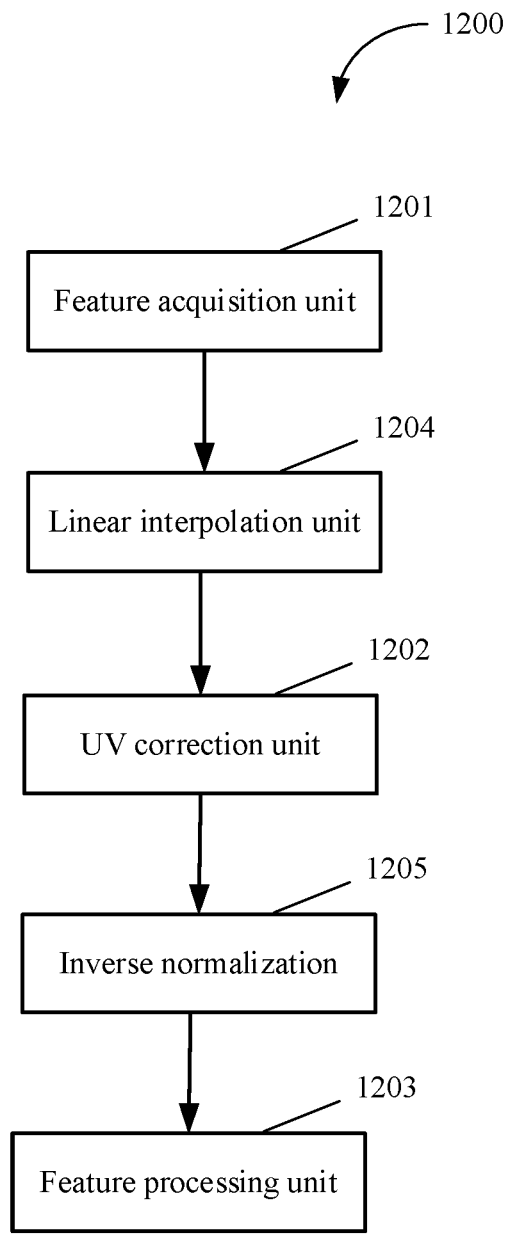
FIG. 12 is a schematic structural diagram of a post-processing apparatus according to an embodiment of the present disclosure.

FIG. 12 is a schematic structural diagram of a post-processing apparatus according to an embodiment of the present disclosure. As shown in FIG. 12, the apparatus 1200 may include: a feature acquisition unit 1201, a UV correction unit 1202 and a feature processing unit 1203, and may further include a linear interpolation unit 1204 and an inverse normalization unit 1205. Main functions of the component units are as follows.

The feature acquisition unit 1201 is configured to acquire a vocoder feature obtained for text.

The UV correction unit 1202 is configured to correct a value of a UV feature in the vocoder feature according to an energy feature and/or a speech spectrum feature in the vocoder feature.

The feature processing unit 1203 is configured to provide the corrected vocoder feature for a vocoder, so as to obtain synthesized speech.

The UV correction unit 1202 is specifically configured to determine whether an energy feature value corresponding to frame with a value of 1 on a value change boundary of a UV feature sequence in the vocoder feature is less than 0, and if yes, correct a UV feature value of the frame to 0; and determine whether a ratio of an energy feature value corresponding to frame with a value of 0 on the value change boundary of the UV feature sequence to the energy feature value corresponding to the frame with the value of 1 adjacent thereto is greater than a preset ratio threshold, and if yes, correct a UV feature value of the frame with the value of 0 to 1.

The UV correction unit 1202 is specifically configured to, for each frame, if a maximum value of first M dimensions of a speech spectrum feature of the frame is less than a preset first threshold, set a UV feature value of the frame to 1; and if the maximum value of the first M dimensions of the speech spectrum feature of the frame is greater than a preset second threshold, set the UV feature value of the frame to 0; wherein M is a preset positive integer, and the second threshold is greater than the first threshold.

As a preferred implementation, the speech spectrum feature is a mel spectrum feature, M is 20, the first threshold is 2, and the second threshold is 2.5.

The linear interpolation unit 1204 is configured to linearly interpolate the vocoder feature acquired by the feature acquisition unit 1201 according to a preset interpolation multiple, and provide the vocoder feature after linear interpolation for the UV correction unit.

Furthermore, the inverse normalization unit 1205 is configured to inversely normalize a preset type of feature sequences in the corrected vocoder feature, wherein the inversely normalizing corresponds to normalizing the preset type of feature sequences during the training of a speech synthesis model, the speech synthesis model being a source for the acquiring a vocoder feature obtained for text.

Correspondingly, the feature processing unit 1203 provides the vocoder feature processed by the inverse normalization unit 1205 for the vocoder.

Herein, it is to be noted that the speech synthesis apparatus 1100 and the post-processing apparatus 1200 may be arranged separately or arranged as one apparatus, or some units thereof are combined into one apparatus, which is not limited in the present disclosure.

Various embodiments in the specification are described progressively. Same and similar parts among the embodiments may be referred to one another, and each embodiment focuses on differences from other embodiments. In particular, the apparatus embodiments are basically similar to the method embodiments, so the description thereof is relatively simple. Related parts may be obtained with reference to the corresponding description in the method embodiments.

Acquisition, storage and application of users' personal information involved in the technical solutions of the present disclosure comply with relevant laws and regulations, and do not violate public order and moral.

According to embodiments of the present disclosure, the present application further provides an electronic device, a readable storage medium and a computer program product.

Figure 13:
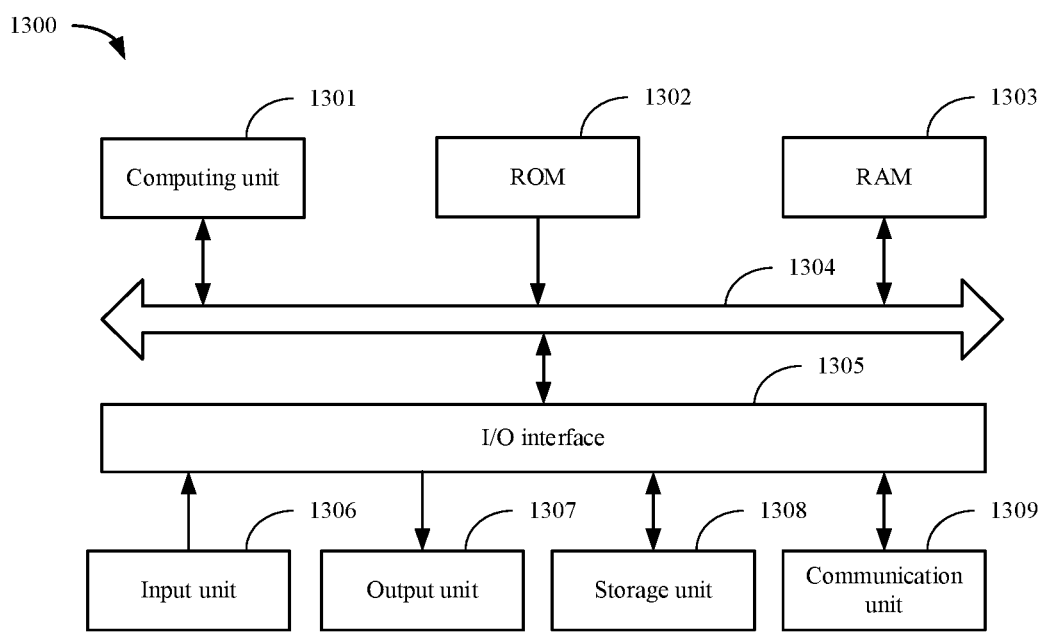
FIG. 13 is a block diagram of an electronic device configured to implement embodiments of the present disclosure.

FIG. 13 is a block diagram of an electronic device configured to perform a speech synthesis method according to an embodiment of the present disclosure. The electronic device is intended to represent various forms of digital computers, such as laptops, desktops, workbenches, personal digital assistants, servers, blade servers, mainframe computers and other suitable computing devices. The electronic device may further represent various forms of mobile devices, such as personal digital assistants, cellular phones, smart phones, wearable devices and other similar computing devices. The components, their connections and relationships, and their functions shown herein are examples only, and are not intended to limit the implementation of the present disclosure as described and/or required herein.

As shown in FIG. 13, the device 1300 includes a computing unit 1301, which may perform various suitable actions and processing according to a computer program stored in a read-only memory (ROM) 1302 or a computer program loaded from a storage unit 1308 into a random access memory (RAM) 1303. The RAM 1303 may also store various programs and data required to operate the device 1300. The computing unit 1301, the ROM 1302 and the RAM 1303 are connected to one another by a bus 1304. An input/output (I/O) interface 1305 may also be connected to the bus 1304.

A plurality of components in the device 1300 are connected to the I/O interface 1305, including an input unit 1306, such as a keyboard and a mouse; an output unit 1307, such as various displays and speakers; a storage unit 1308, such as disks and discs; and a communication unit 1309, such as a network card, a modem and a wireless communication transceiver. The communication unit 1309 allows the device 1300 to exchange information/data with other devices over computer networks such as the Internet and/or various telecommunications networks.

The computing unit 1301 may be a variety of general-purpose and/or special-purpose processing components with processing and computing capabilities. Some examples of the computing unit 1301 include, but are not limited to, a central processing unit (CPU), a graphics processing unit (GPU), various artificial intelligence (AI) computing chips, various computing units that run machine learning model algorithms, a digital signal processor (DSP), and any appropriate processor, controller or microcontroller, etc. The computing unit 1301 performs the methods and processing described above, such as the speech synthesis method. For example, in some embodiments, the speech synthesis method may be implemented as a computer software program that is tangibly embodied in a machine-readable medium, such as the storage unit 1308.

In some embodiments, part or all of a computer program may be loaded and/or installed on the device 1300 via the ROM 1302 and/or the communication unit 1309. One or more steps of the speech synthesis method described above may be performed when the computer program is loaded into the RAM 1303 and executed by the computing unit 1301. Alternatively, in other embodiments, the computing unit 1301 may be configured to perform the speech synthesis method by any other appropriate means (for example, by means of firmware).

Various implementations of the systems and technologies disclosed herein can be realized in a digital electronic circuit system, an integrated circuit system, a field programmable gate array (FPGA), an application-specific integrated circuit (ASIC), an application-specific standard product (ASSP), a system on chip (SOC), a complex programmable logic device (CPLD), computer hardware, firmware, software, and/or combinations thereof. Such implementations may include implementation in one or more computer programs that are executable and/or interpretable on a programmable system including at least one programmable processor, which can be special or general purpose, configured to receive data and instructions from a storage system, at least one input apparatus, and at least one output apparatus, and to transmit data and instructions to the storage system, the at least one input apparatus, and the at least one output apparatus.

Program codes configured to implement the method in the present disclosure may be written in any combination of one or more programming languages. Such program codes may be supplied to a processor or controller of a general-purpose computer, a special-purpose computer, or another programmable data processing apparatus to enable the function/operation specified in the flowchart and/or block diagram to be implemented when the program codes are executed by the processor or controller. The program codes may be executed entirely on a machine, partially on a machine, partially on a machine and partially on a remote machine as a stand-alone package, or entirely on a remote machine or a server.

In the context of the present disclosure, machine-readable media may be tangible media which may include or store programs for use by or in conjunction with an instruction execution system, apparatus or device. The machine-readable media may be machine-readable signal media or machine-readable storage media. The machine-readable media may include, but are not limited to, electronic, magnetic, optical, electromagnetic, infrared, or semiconductor systems, apparatuses or devices, or any suitable combinations thereof. More specific examples of machine-readable storage media may include electrical connections based on one or more wires, a portable computer disk, a hard disk, an RAM, an ROM, an erasable programmable read only memory (EPROM or flash memory), an optical fiber, a compact disk read only memory (CD-ROM), an optical storage device, a magnetic storage device, or any suitable combination thereof.

To provide interaction with a user, the systems and technologies described here can be implemented on a computer. The computer has: a display apparatus (e.g., a cathode-ray tube (CRT) or a liquid crystal display (LCD) monitor) for displaying information to the user; and a keyboard and a pointing apparatus (e.g., a mouse or trackball) through which the user may provide input for the computer. Other kinds of apparatuses may also be configured to provide interaction with the user. For example, a feedback provided for the user may be any form of sensory feedback (e.g., visual, auditory, or tactile feedback); and input from the user may be received in any form (including sound input, voice input, or tactile input).

The systems and technologies described herein can be implemented in a computing system including background components (e.g., as a data server), or a computing system including middleware components (e.g., an application server), or a computing system including front-end components (e.g., a user computer with a graphical user interface or web browser through which the user can interact with the implementation schema of the systems and technologies described here), or a computing system including any combination of such background components, middleware components or front-end components. The components of the system can be connected to each other through any form or medium of digital data communication (e.g., a communication network). Examples of the communication network include: a local area network (LAN), a wide area network (WAN) and the Internet.

The computer system may include a client and a server. The client and the server are generally far away from each other and generally interact via the communication network. A relationship between the client and the server is generated through computer programs that run on a corresponding computer and have a client-server relationship with each other. The server may be a cloud server, also known as a cloud computing server or cloud host, which is a host product in the cloud computing service system to solve the problems of difficult management and weak business scalability in the traditional physical host and a Virtual Private Server (VPS). The server may also be a distributed system server, or a server combined with blockchain.

It should be understood that the steps can be reordered, added, or deleted using the various forms of processes shown above. For example, the steps described in the present application may be executed in parallel or sequentially or in different sequences, provided that desired results of the technical solutions disclosed in the present disclosure are achieved, which is not limited herein.

The above specific implementations do not limit the protection scope of the present disclosure. Those skilled in the art should understand that various modifications, combinations, sub-combinations, and replacements can be made according to design requirements and other factors. Any modifications, equivalent substitutions and improvements made within the spirit and principle of the present disclosure all should be included in the protection scope of the present disclosure.

What is claimed is:

1. A speech synthesis method, comprising:
acquiring to-be-synthesized text;
acquiring a prosody feature extracted from the text;

inputting the text and the prosody feature into a speech synthesis model to obtain a vocoder feature; and inputting the vocoder feature into a vocoder to obtain synthesized speech, wherein the speech synthesis model comprises a second encoder, a second decoder and a post-net;

the second encoder is configured to extract a language feature from the text, splice the language feature with the prosody feature, or splice the language feature, the prosody feature and a speaker feature, and output a second splicing feature obtained by splicing to the second decoder;

the second decoder is configured to predict an acoustic feature of a current frame by using a predicted acoustic feature of a previous frame and the second splicing feature and output it to the post-net wherein the acoustic feature comprises a speech spectrum feature; and the post-net is configured to predict the vocoder feature by using the acoustic feature, wherein the second decoder predicting an acoustic feature of a current frame by using a predicted acoustic feature of a previous frame and the second splicing feature comprises:

splicing, by the second decoder, a feature obtained by causing the acoustic feature of the previous frame to pass through the pre-net and the second splicing feature after attention processing to obtain a third splicing feature; the third splicing feature being processed by a long-short term memory (LSTM) and inputted into a linear prediction layer, and the linear prediction layer predicting the acoustic feature of the current frame.

2. The method according to claim 1, wherein the acquiring a prosody feature extracted from the text comprises: inputting the text into a prosody prediction model to obtain the prosody feature;

wherein the prosody prediction model comprises a first encoder and a first decoder;

the first encoder is configured to extract a language feature from the text and then output the language feature to the first decoder; and the first decoder is configured to predict a prosody feature of a current frame by using a predicted prosody feature of a previous frame and the language feature; or the first decoder is configured to extract a language feature from the text, splice a broadcast style feature extracted from the text with the language feature, and input an obtained first splicing feature into the first decoder; and the first decoder is configured to predict a prosody feature of a current frame by using a predicted prosody feature of a previous frame and the first splicing feature.

3. The method according to claim 1, wherein the post-net predicting the vocoder feature by using the acoustic feature comprises:

causing, by the post-net, the acoustic feature to be processed by a CBHG module and then predicted by N prediction modules, prediction results constituting the vocoder feature, wherein the prediction modules comprise a bidirectional Gate Recurrent Unit (GRU) and a linear projection layer, and N is a positive integer.

4. The method according to claim 1, wherein the speech synthesis model is pre-trained in the following manner:

acquiring training samples, each comprising a text sample and a prosody feature and a vocoder feature annotating the text sample; and training the speech synthesis model by taking the text sample and the annotated prosody feature as input to the speech synthesis model and the annotated vocoder feature as target output of the speech synthesis model.

5. The method according to claim 1, wherein the speech synthesis model is pre-trained in the following manner:

acquiring training samples, each comprising a text sample and an acoustic feature and a vocoder feature annotating the text sample; and training a prosody extraction model and the speech synthesis model by taking the annotated acoustic feature as input to the prosody extraction model, a prosody feature outputted by the prosody extraction model and the text sample as input to a language synthesis model, and the annotated vocoder feature as target output of the language synthesis model.

6. The method according to claim 1, wherein the speech synthesis model is pre-trained in the following manner:

acquiring training samples, each comprising a text sample and a vocoder feature annotating the text sample; and training a prosody prediction model and the speech synthesis model by taking the text sample as input to the prosody prediction model, a prosody feature outputted by the prosody prediction model and the text sample as input to a language synthesis model, and the annotated vocoder feature as target output of the language synthesis model.

7. The method according to claim 1, wherein the speech synthesis model is pre-trained in the following manner:

acquiring training samples, each comprising a text sample and an acoustic feature and a vocoder feature annotating the text sample; and training a prosody prediction model, a prosody extraction model and the speech synthesis model by taking the annotated acoustic feature as input to the prosody extraction model, a prosody feature outputted by the prosody extraction model and the text sample as input to a language synthesis model, the annotated vocoder feature as target output of the language synthesis model, the text sample as input to the prosody prediction model, and the prosody feature outputted by the prosody extraction model as target output of the prosody prediction model.

8. The method according to claim 5, wherein the prosody extraction model comprises: a convolutional layer, a bidirectional GRU layer and an attention layer; and after the annotated acoustic feature passes through the convolutional layer and the bidirectional GRU layer, an obtained feature and a language feature extracted by the second encoder in the speech synthesis model are inputted into the attention layer for attention processing, to obtain the prosody feature.

9. The method according to claim 7, wherein the prosody extraction model comprises: a convolutional layer, a bidirectional GRU layer and an attention layer; and after the annotated acoustic feature passes through the convolutional layer and the bidirectional GRU layer, an obtained feature and a language feature extracted by the second encoder in the speech synthesis model are inputted into the attention layer for attention processing, to obtain the prosody feature.

10. The method according to claim 4, wherein the acquiring training samples comprises:

acquiring standard speech, and determining text corresponding to the standard speech as the text sample;

extracting at least one of the acoustic feature and the vocoder feature from the standard speech to be annotated with the text sample; and/or extracting the prosody feature from the text sample to annotate the text sample.

11. An electronic device, comprising:

at least one processor; and a memory communicatively connected with the at least one processor;

wherein the memory stores instructions executable by the at least one processor, and the instructions are executed by the at least one processor to enable the at least one processor to perform a speech synthesis method, wherein the speech synthesis method comprises:

acquiring to-be-synthesized text;

acquiring a prosody feature extracted from the text;

inputting the text and the prosody feature into a speech synthesis model to obtain a vocoder feature; and inputting the vocoder feature into a vocoder to obtain synthesized speech, wherein the speech synthesis model comprises a second encoder, a second decoder and a post-net;

the second encoder is configured to extract a language feature from the text, splice the language feature with the prosody feature, or splice the language feature, the prosody feature and a speaker feature, and output a second splicing feature obtained by splicing to the second decoder:

the second decoder is configured to predict an acoustic feature of a current frame by using a predicted acoustic feature of a previous frame and the second splicing feature and output it to the post-net wherein the acoustic feature comprises a speech spectrum feature; and the post-net is configured to predict the vocoder feature by using the acoustic feature, wherein the second decoder predicting an acoustic feature of a current frame by using a predicted acoustic feature of a previous frame and the second splicing feature comprises:

splicing, by the second decoder, a feature obtained by causing the acoustic feature of the previous frame to pass through the pre-net and the second splicing feature after attention processing to obtain a third splicing feature; the third splicing feature being processed by a long-short term memory (LSTM) and inputted into a linear prediction layer, and the linear prediction layer predicting the acoustic feature of the current frame.

12. The electronic device according to claim 11, wherein the acquiring a prosody feature extracted from the text comprises: inputting the text into a prosody prediction model to obtain the prosody feature;

wherein the prosody prediction model comprises a first encoder and a first decoder;

the first encoder is configured to extract a language feature from the text and then output the language feature to the first decoder; and the first decoder predicts a prosody feature of a current frame by using a predicted prosody feature of a previous frame and the language feature; or the first decoder is configured to extract a language feature from the text, splice a broadcast style feature extracted from the text with the language feature, and input an obtained first splicing feature into the first decoder; and the first decoder predicts a prosody feature of a current frame by using a predicted prosody feature of a previous frame and the first splicing feature.

13. The electronic device according to claim 11, wherein the post-net predicting the vocoder feature by using the acoustic feature comprises:

causing, by the post-net, the acoustic feature to be processed by a CBHG module and then predicted by N prediction modules, prediction results constituting the vocoder feature, wherein the prediction modules comprise a bidirectional GRU and a linear projection layer, and N is a positive integer.

14. The electronic device according to claim 11, wherein the speech synthesis model is pre-trained in the following manner:

acquiring training samples, each comprising a text sample and a prosody feature and a vocoder feature annotating the text sample; and training the speech synthesis model by taking the text sample and the annotated prosody feature as input to the speech synthesis model and the annotated vocoder feature as target output of the speech synthesis model.

15. The electronic device according to claim 11, wherein the speech synthesis model is pre-trained in the following manner:

acquiring training samples, each comprising a text sample and an acoustic feature and a vocoder feature annotating the text sample; and training a prosody extraction model and the speech synthesis model by taking the annotated acoustic feature as input to the prosody extraction model, a prosody feature outputted by the prosody extraction model and the text sample as input to a language synthesis model, and the annotated vocoder feature as target output of the language synthesis model.

16. A non-transitory computer readable storage medium with computer instructions stored thereon, wherein the computer instructions are used for causing a speech synthesis method, wherein the speech synthesis method comprises:

acquiring to-be-synthesized text;

acquiring a prosody feature extracted from the text;

inputting the text and the prosody feature into a speech synthesis model to obtain a vocoder feature; and inputting the vocoder feature into a vocoder to obtain synthesized speech, wherein the speech synthesis model comprises a second encoder, a second decoder and a post-net;

the second encoder is configured to extract a language feature from the text, splice the language feature with the prosody feature, or splice the language feature, the prosody feature and a speaker feature, and output a second splicing feature obtained by splicing to the second decoder;

the second decoder is configured to predict an acoustic feature of a current frame by using a predicted acoustic feature of a previous frame and the second splicing feature and output it to the post-net wherein the acoustic feature comprises a speech spectrum feature; and the post-net is configured to predict the vocoder feature by using the acoustic feature, wherein the second decoder predicting an acoustic feature of a current frame by using a predicted acoustic feature of a previous frame and the second splicing feature comprises:

splicing, by the second decoder, a feature obtained by causing the acoustic feature of the previous frame to pass through the pre-net and the second splicing feature after attention processing to obtain a third splicing feature; the third splicing feature being processed by a long-short term memory (LSTM) and inputted into a linear prediction layer, and the linear prediction layer predicting the acoustic feature of the current frame.

* * * * *